United States Patent Office 3,703,355
Patented Nov. 21, 1972

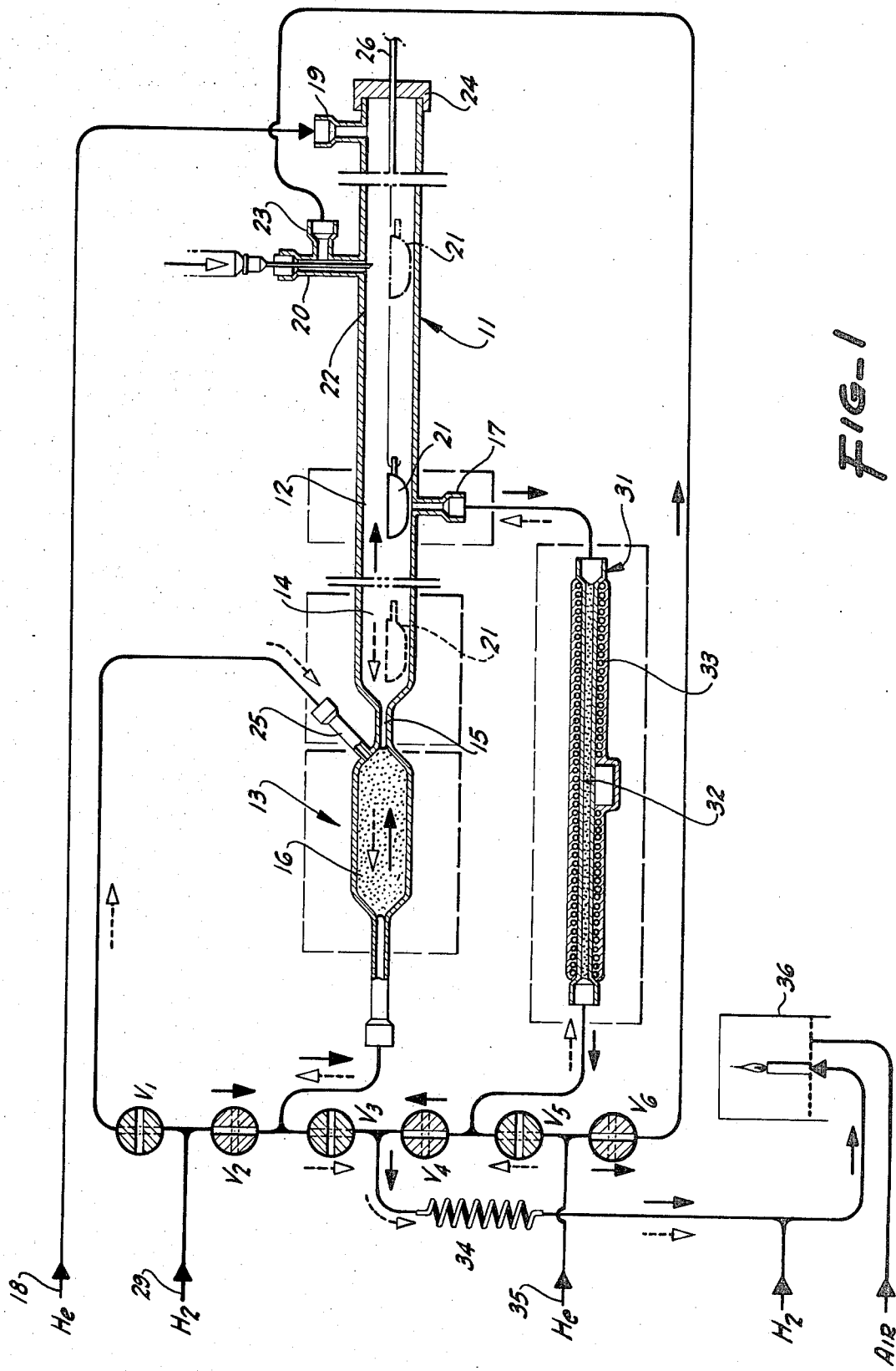

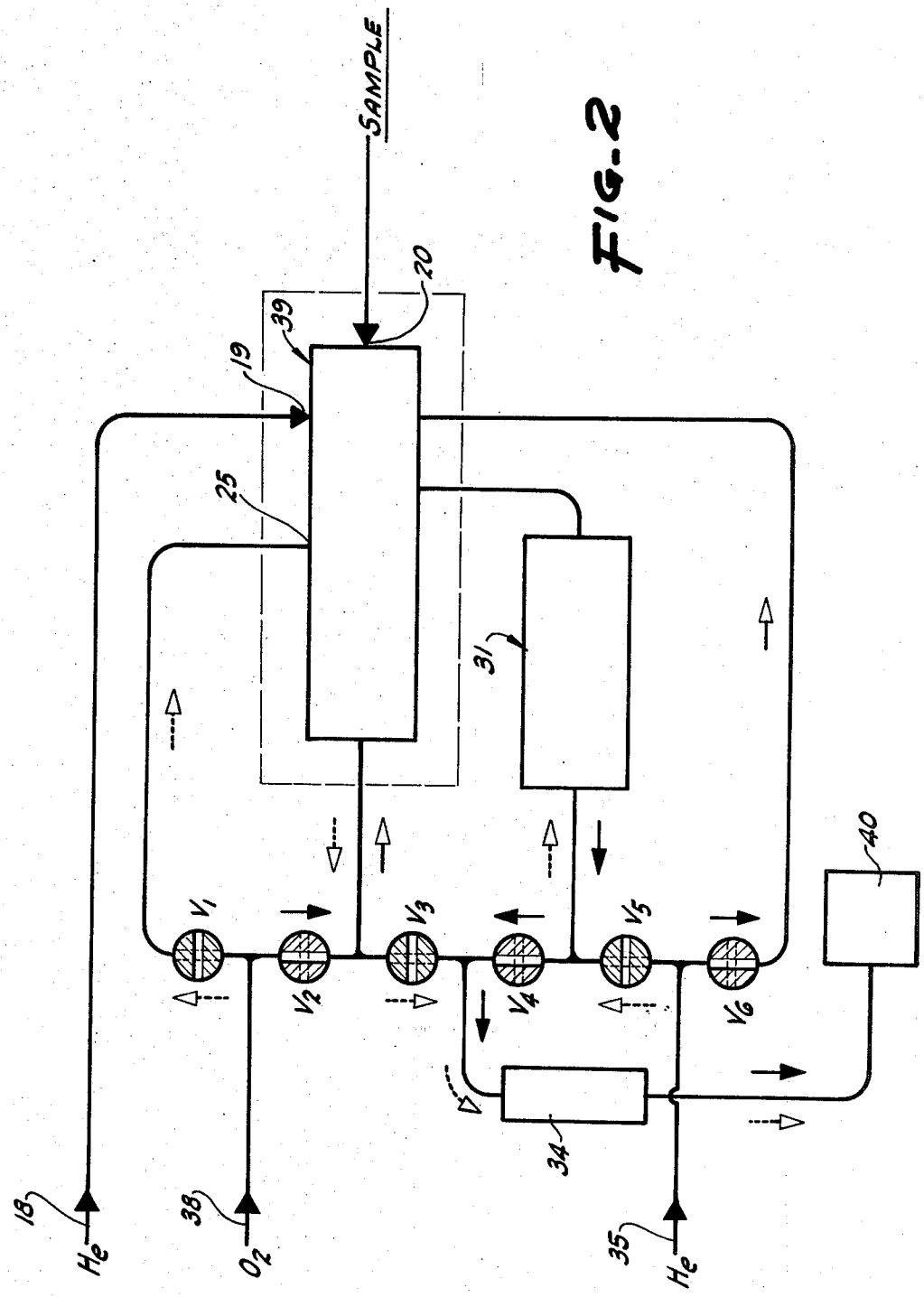

3,703,355
PYROLYSIS AND ANALYSIS SYSTEM
Yoshihiro Takahashi, San Francisco, Robert T. Moore, Palo Alto, and Thomas M. Stephens, Menlo Park, Calif., assignors to Dohrmann Division, Envirotech Corporation, Mountain View, Calif.
Filed Dec. 10, 1971, Ser. No. 206,839
Int. Cl. G01n 31/10, 31/12
U.S. Cl. 23—230 PC
28 Claims

ABSTRACT OF THE DISCLOSURE

A method and apparatus for directly selectively analyzing organic carbon or other predetermined compounds in a sample-containing fluid such as wastewater. The organic carbon in the wastewater sample is either oxidatively pyrolyzed to carbon dioxide or reductively pyrolyzed to methane, which products are then analyzed. Prior to pyrolysis, the inorganic carbonate and bicarbonate salts present in the water are removed by acidification to carbonic acid and vaporization of the carbon dioxide component in a volatilization zone. The vapors, including certain volatile organic carbon compounds, are directed in a carrier gas through a packed detention column for sorption of the organic carbon compounds on the packing while the carbon dioxide is vented. Thereafter the carrier gas flow is reversed and the sorbed compounds are desorbed and conveyed to a pyrolysis zone wherein they are pyrolyzed along with the unvaporized sample and converted to a gaseous pyrolysis product which is quantitatively analyzed. The wastewater may be supplied in a boat to the volatilization zone and the boat moved into the pyrolysis zone during pyrolysis.

BACKGROUND OF THE INVENTION

Increasing concern for the environment has prompted the development of systems for the quantitative analysis of carbon or nitrogen compounds in wastewater and drinking water as indicative of contamination. An independent precise reading of the objectionable organic carbon separate from the inorganic carbon is desirable. For typical samples, the most significant quantity of inorganic carbon is in the form of inorganic carbonate and bicarbonate salts. At the present time, no system is being used commercially which is capable of directly analyzing the organic carbon content. In one system of indirect organic carbon determination, a wastewater sample is split into two streams. One stream is oxidatively pyrolyzed at, say, 900° C. and the pyrolysis product, carbon dioxide, is analyzed by an infrared detector. The recorded value is indicative of the total carbon content. The other stream is acidified to convert the inorganic carbonates and bicarbonates to carbonic acid and the carbon dioxide component of the acid is driven off at elevated temperatures of, say, 200° C. and analyzed in the infrared detector. This value indicates the total inorganic carbon content. The organic carbon content is obtained indirectly by subtracting the total inorganic content from the total carbon content. This results in poor sensitivity and can lead to substantial errors, especially where the organic carbon level is relatively low in comparison to the total carbon level.

In another indirect approach to quantitating the organic content, a first sample stream is oxidized to carbon dioxide and a second sample stream is acidified to drive off carbon dioxide in the manner described above. Thereafter, the streams are sequentially converted to methane in a reductive pyrolysis zone for subsequent flame ionization detection. The difference between the two readings is equated to the total organic content. However, this system is subject to the aforementioned sources of error.

There are systems employed today for the oxidative or reductive pyrolysis of nitrogen compounds in a sample and subsequent analysis of the products of pyrolysis as by electrochemical microcoulometry. Such systems measure the total nitrogen content. It would be desirable to selectively determine the ammonia and low molecular weight amines in a separate quantitation from the remainder of the organic nitrogen compounds.

SUMMARY OF THE INVENTION AND OBJECTS

It is an object of the invention to provide a system for selectively analyzing the level of elements such as carbon and nitrogen of a predetermined type.

It is a further object of the invention to provide a system of the above type in which a selected sample portion is either oxidatively or reductively pyrolyzed and thereafter directly analyzed.

It is a particular object of the invention to provide an oxidative or reductive pyrolytic system for the direct analysis of the organic carbon content of a water sample.

Further objects of the invention will be apparent from the following description taken in conjunction with the appended drawings.

In accordance wtih the above objects, a method and apparatus have been provided for selectively analyzing a predetermined portion of a sample-containing fluid for a selected element such as carbon or nitrogen in a particular form. To simplify the present discussion, carbon is described as the selected element and organic carbon as the predetermined form. In accordance with generally accepted nomenclature, the term organic carbon is defined as including hydrocarbons and carbohydrates while excluding inorganic carbonates and bicarbonates as well as carbon monoxide and carbon dioxide gas. To further simplify the present discussion, water will be utilized as the fluid in which the sample is either suspended or dissolved. It should be understood that any other fluid may be employed as the sample medium so long as its presence does not interfere with analysis.

To directly analyze the organic content of a wastewater or drinking water sample in either an oxidative or reductive pyrolytic system, it is necessary to remove the inorganic carbonate and bicarbonate salts present in the water. In a reductive pyrolytic system, the following steps are employed. First, the sample is acidified to a sufficient extent to convert such inorganic carbonate and bicarbonate salts to carbonic acid. Thereafter, in a forward cycle, at least the carbon dioxide component of the formed carbonic acid is volatilized in a first compartment. To accelerate this process, the sample is preferably heated to drive off the carbon dioxide which also volatilizes organic compounds having a low boiling point. As will be explained hereinafter, at this stage the temperature may be elevated to above 100° C. to evaporate the water or on the order of, say, 80° C. in which case the water remains until pyrolysis. The volatilized sample portion is conveyed in a carrier gas stream from this first compartment through a packed detention column wherein certain volatile organic carbon compounds are sorbed on the packing and the remainder of the stream containing the carbon dioxide is vented. Utilizing a suitable packing described hereinafter and at the above temperatures, essentially the only organic carbon compounds which are not sorbed are the low molecular weight hydrocarbons such as methane, ethane, and propane. Such hydrocarbons are normally not present to any significant extent in municipal wastewater and so it is not necessary to analyze the vented stream. However, for certain industrial wastes in which such hydrocarbons are present in significant quantities, the vented stream is directed to the flame detector and this methane, ethane, propane content may be integrated if desired. If the water is vaporized in this zone, it is desirable to pass the vented gas through a stripping column prior to directing the same into the detector. This is not because the water is registered by the detector but because the relatively large quantity of water tends to distort the readings by cooling the flame or possibly even extinguishing the same.

After vaporization, the flow of carrier gas through the detention column is switched to a back flush cycle to desorb the sorbed organic compounds and to direct the same into a pyrolysis zone. Although this reverse flow of carrier gas will be sufficient to desorb essentially all of the organic compounds at the same temperature as that of sorption, it is preferable to increase the temperature during desorption so as to accelerate the process. The desorbed organic compounds and the non-volatilized sample are pyrolyzed to form a gaseous pyrolysis product; in a reductive pyrolytic system, methane, and in an oxidative system, carbon dioxide. These products are thereafter directed in a carrier gas to a suitable detector.

In one embodiment of the reductive pyrolytic system, acidification and subsequent driving off of the carbon dioxide are performed in a volatilization zone distinct from that utilized for pyrolysis and the mixture is subsequently moved to the pyrolytic zone including an upstream chamber deficient in hydrogen and a downstream hydrogen reaction zone including a nickel catalyst. For this purpose, the sample is supplied in a boat to the carbon dioxide volatilization zone during the forward cycle. An oxidizing agent, such as copper oxide, is supplied in the boat. After volatilization, the back flush cycle is begun and the boat is moved into the upstream zone maintained in a hydrogen-deficient atmosphere. The oxidizing agent serves to react with those desorbed organic carbon compounds and non-volatilized sample organic compounds which would otherwise be reduced to elemental carbon at the high temperature of the upstream zone necessary to volatilize high boiling organic carbon compounds. In the absence of the oxidizing agent, those organic carbon compounds which are reduced to elemental carbon would be undetected in the gas stream. The upstream zone is maintained in a hydrogen-deficient atmosphere so that the copper oxide is not reduced to copper metal by the hydrogen. The pyrolytic product, methane, is then conveyed through a water stripping column to a detector in the carrier gas.

An apparatus for performing the above method utilizes a valve assembly having a forward flush position and a back flush position. In the former position, carrier gas is directed through the volatilization zone to carry carbon dioxide and the volatile organic carbon compounds into the detention column so that the organic carbon compounds are selectively sorbed on the packing. After completion of this cycle, the valve setting is shifted to a back flush position in which the selectively sorbed gas is desorbed from the packing and conveyed into the pyrolysis chamber and the products of pyrolysis are directed to the detector.

In another embodiment of the reductive pyrolytic system for selective organic determination, the use of a boat is eliminated and the sample is directly injected into a single chamber. In the forward flush valve setting, after acidification the sample is heated to drive off the carbon dioxide. When this cycle is completed, the valve setting is switched to the reverse or back flush position and the temperature of the same chamber is increased to that sufficient for pyrolysis. The remainder of the cycle is essentially the same.

Either of the aforementioned systems may be utilized for oxidative pyrolysis in which case an oxygen-containing gas is substituted for hydrogen in the pyrolysis zone. It is apparent that there is no necessity to separate the pyrolysis zone into two chambers for oxidative pyrolysis. In this case, the pyrolysis product, carbon dioxide, is directed through a different type of detector, say, of the infrared type.

BRIEF DESCRIPTION OF THE DRAWINGS

FIGS. 1 and 2 are schematic flow diagrams of reductive and oxidative pyrolytic embodiments, respectively, of the present invention.

DETAILED DESCRIPTION OF THE PREFERRED EMBODIMENTS

Referring to FIG. 1, a flow diagram is illustrated suitable for reductive pyrolysis in accordance with the present invention. For purposes of the present discussion, the sample to be analyzed includes inorganic carbonate and bicarbonate salts as well as organic carbon compounds. The entire flow system is maintained in a gas-tight condition to avoid interfering contaminants from the surrounding environment. Although helium is designated as the carrier gas, other inert gases such as argon may be employed.

The apparatus includes an elongated tube 11 with an integral portion defining a vaporization chamber 12 having a port 17 for the inlet and egress of gas. Chamber 12 is, in turn, sealingly engaged with a pyrolysis assembly 13 divided into an upstream heating chamber 14 interconnected by a linking tube 15 with downstream hydrogen reaction chamber 16. Tube 15 is preferably of capillary dimension to prevent back diffusion of hydrogen from chamber 16 into chamber 14 as explained hereinafter. Chambers 12, 14, and 16 are provided with independent temperature-controlled furnaces schematically illustrated in FIG. 1 by dotted lines about each one. The walls of chambers 14 and 16 are preferably formed of a material, such as quartz, capable of withstanding the temperatures of pyrolysis. Tube 11 is provided with an auxiliary helium gas stream, preferably flowing at all times, from a suitable source 18 through a gas-tight inlet port 19.

A gas-sealed sample injection port 20 is provided for the metered injection of sample suitable through a hypodermic-type needle into a movable boat 21 located therebelow at a sample loading station 22. Sample port 20 also includes a side arm inlet port 23 for helium supplied from a source to be described hereinafter. Tube 11 is sealed at its right end against ambient gases by a closure cap 24. The sample is supplied to port 20 from a suitable fluid sample supply means, not shown, for accurately metering the amount deposited in the boat. This means may be automatically connected to the exit side of a wastewater plant or to a drinking water supply to periodically make sample determinations.

Chamber 16 is formed to reductively pyrolyze carbon compounds to methane and includes a side arm 25 sealed from the environment for the direct introduction of hydrogen from source 29. A catalyst, preferably nickel, is provided in chamber 16 to assist the production of methane.

A feed-through passage for carrying boat 21 is provided from sample loading station 22 through vaporization chamber 12 and into upstream chamber 14. Boat engaging and moving means including a push rod assembly 26 with a rod connected through an extension hook engaging an opening in the rear wall of boat 21 and extending through an enclosure cap 24. The hook is formed of a material, such as platinum, capable of withstanding pyrolytic temperatures. Means, not shown, are provided to periodically move the boat from the sample loading station 22, to a position within vaporization chamber 12, to a position within upstream chamber 14, and back to station 22. The entire fluid supply system is suitably of the type described in U.S. patent application Ser. No. 119,672 entitled "Fluid Sampler Apparatus and Method," incorporated herein by reference. In that system, actuation of the rod assembly is by gas-operated reciprocal piston assembly with intermediate stop positions provided by gas bleed valves in the piston housing side walls intermediate the end walls.

As fully decribed in the aforementioned U.S. patent application, boat 21 is suitably formed of a heat-resistive material such as platinum, quartz, alumina, and the like which is capable of withstanding the temperatures of pyrolysis. The boat includes a central cavity for containing the sample. The bottom of the boat is formed in a curved planar configuration to conform to the lower surface of the feed-through passage so that it may be moved therethrough without tipping. The rear wall of the boat is provided with a small hole or loop for linking with the aforementioned hooked portion of the push rod assembly.

A packed detention column 31 is provided with suitable packing 32 capable of retaining essentially all of the organic carbon content of a wastewater sample from a typical municipal stream while permitting carbon dioxide to pass therethrough. This packing normally permits the passage of saturated low molecular weight hydrocarbon such as methane, ethane, and propane but these are not normally present to any significant extent in municipal wastewater. A suitable packing of the aforementioned type is a copolymer of styrene and divinyl benzene sold under the trade name "Poropak Q" by Waters Associates and another particular porous polymer sold under the trade name "Chromosorb 101" by Johns-Manville. Other packings having the aforementioned characteristics, normally employed in gas chromatographic columns, may be utilized.

Packed detention column 31 is provided with a variable temperature heating means schematically illustrated by dotted lines thereabout. Although external furnace means could be employed for this purpose, it is preferable to provide heating means which can rapidly alter the temperature of the column. For this purpose, it has been found that altering the normally coiled configuration of the packed column to form an essentially straight tube of relatively low mass and utilizing a variable resistance electrical heating coil 33 provides a desired rapid response. A suitable abrasion-resistive coating, such as formed of silicone rubber, may be formed about the coil.

A water stripping column 34 is provided to remove water entrained in the gas stream by chemisorption prior to passage into the indicator means 36 for detecting gas of a predetermined character described hereinafter. The column may be of a coiled configuration and packed with material of a suitable water adsorbing type. Calcium sulfate granules have been found to be particularly effective for this purpose since the column can be self-regenerated as by sitting overnight disconnected from the system or more rapidly by heating to, say, 130° C.

It is noted that the water stripping column is on stream during both the forward and back flush cycles even though the flame ionization detector does not detect to water. This is because the relatively large amounts of water flowing through the system could cause a distortion of the base line value as by lowering the temperature of the flame or for other reasons.

A detector suitable for the reductive pyrolytic system for analyzing organic carbon is of the flame ionization detection type selectively responsive to methane such as sold by the Dohrmann Division of Envirotech Corporation for utilization in a gas chromatograph of its 2460 series. A detector of this type utilizes a hydrogen auxiliary stream and an air stream as indicated in FIG. 1.

Referring again to FIG. 1, suitable valve means comprising six 2-way valves $V_1$-$V_6$ are provided to direct the gas of the overall system in a forward flush position, indicated as solid arrows, and a reverse flush position, indicated as dotted arrows. In the former position $V_1$, $V_3$, and $V_5$ are in a closed position while valves $V_2$, $V_4$, and $V_6$ are in an open position. When the system is reversed to a forward flush position, the above valve settings are reversed. The valves may be heated in a suitable valve oven, not shown, to temperatures on the order of 80° C. to 120° C. to avoid vapor condensation within the valves.

Referring again to the flow diagram in FIG. 1, the invention will be most readily described by first illustrating the system with the valves in a forward flush position. Carrier gas, say helium, is continuously directed from source 18 through the system for both the back and forward flush positions. Prior to the movement of gas in the forward flush position, a sample of a suitable predetermined size, such as 30–50 microliters, is supplied, suitably through a syringe, through sample port 20 into boat 21 at the sample loading station. The sample is acidified either prior or subsequent to injection into the boat by the addition of a suitable inorganic acid which does not interfere with analysis, such as hydrochloric acid. A sufficient quantity of acid is added to convert the inorganic carbonate and bicarbonate salts present in the sample water to carbonic acid. After sample addition, the boat is moved to vaporization chamber 12. The temperature in the vaporization chamber is preferably high enough to vaporize the entire carbon dioxide component of the carbonic acid in a relatively short period of time. However, if desired, the vaporization chamber may be maintained at room temperature for a relatively extended period of time for the carbon dioxide to vaporize. It has been found that at a temperature of 80° C. that a residence time of 1.5 minutes is sufficient to vaporize essentially all of the formed carbon dioxide.

With the valve setting in the forward flush position, as indicated by the solid lines, hydrogen from source 29 is directed through open valve $V_2$ through pyrolysis assembly 13, vaporization chamber 12, detention column 31 past open valve $V_4$, through water stripping column 34 and through the detector 36. Helium carrier gas from source 35 is directed through open valve $V_6$ to the carrier gas side arm port 23 as an auxiliary to carrier gas from source 18 and to the hydrogen from source 29, all of which serve to flush the gases from vaporization chamber 12. At this valve setting a positive pressure is applied through pyrolysis assembly 13 towards vaporization chamber 12 so that none of the gases vaporizing in the latter chamber are permitted to flow into the former chamber.

A suitable temperature range for the vaporization chamber is from about 80° C. to about 110° C. The lower limit is to assure rapid and complete volatilization of the formed carbon dioxide. The upper limit is to conform with the desirable temperature of the detention column immediately downstream for reasons to be presently described.

At temperatures sufficient for volatilization of carbon dioxide, a certain amount of low boiling organic compounds are also volatilized. Except for methane, ethane and propane, essentially all of these organic compounds are adsorbed on packing of the aforementioned type. In a typical domestic wastewater, there is no significant amount of these saturated hydrocarbons. Accordingly, the integrator for detector 36 is programmed to be in an off position since there is insufficient methane, ethane or propane in the stream to be of interest. If an industrial wastewater having a relatively significant amount of these saturated hydrocarbons is to be analyzed, it would be a simple matter to reprogram the detector 36 to measure and integrate the results of this gas stream during the forward flush cycle. The total organic carbon content would be obtained by adding this value to that measured in the back flush cycle to be described below.

Referring to FIG. 1, in a back flush cycle, the boat is moved into the upstream chamber 14 of the pyrolysis assembly 13 and the valve settings are reversed as indicated by the dotted positions to gas flow along the dotted arrows. In the new setting, helium carrier gas from source 35 is directed through open valve $V_5$ and through detention column 31 to desorb the sorbed organic compounds on packing 32. Thereafter these compounds are carried into the pyrolysis assembly where they are reacted to form methane and through open valve $V_3$, water stripping column 34, and into the flame detector.

The temperature of the detention column during the back flush cycle is preferably elevated from that utilized in the forward flush cycle to reduce the timing of desorption. However, by increasing the time of the back flush cycle, the same temperature may be used in the detention column for both cycles. It has been found that if the temperature of the detention column exceeds the 130–150° C. during the back flush operation when utilizing a packing of the aforementioned "Poropak Q" type that a certain amount of organic carbon interference is introduced into the system from the packing itself. Accordingly, it is desirable to operate the detention column at temperatures no higher than 130° C. during the back flush operation. It is apparent that the temperature differential in the detention column between the forward and back flush cycles provides a driving force to increase the desorption rate. Since the temperature of the gas during the forward flush cycle is dependent upon the temperature utilized during vaporization, it is desirable to maintain the vaporization temperature at a relatively low value such as 80° C. On the other hand, by vaporizing the water at, say, 100° C. or more during the forward flush vaporization, the water would be removed prior to the major determination of organic carbon which occurs in the back flush operation and so would be less likely to reach the detector when it is in the measurement integration stage.

During the back flush cycle, the organic carbon compounds in the sample in boat 21 are vaporized in chamber 14 and conveyed into chamber 16 wherein they are converted into methane which is detected by the flame ionization detector 36. It has been found that certain organic carbon compounds may be reduced to elemental carbon at the temperatures of pyrolysis, on the order of 500–700° C., in the absence of an oxidizing agent. This carbon deposits in the boat and is not recorded by the detector 35 resulting in error. To avoid this, it has been found that an oxidizing agent, such as copper oxide, may be provided to chamber 14 in the boat to convert organic compounds of the above type into carbon dioxide which is reduced to methane on the nickel catalyst in the downstream hydrogen-reaction chamber. In the absence of oxidizing agent, temperatures as high as 900° C. may be necessary for complete vaporization of organic carbon compounds in chamber 14. Hydrogen is supplied directly to chamber 16 and linking tube 15 is formed of capillary so that hydrogen does not enter chamber 14 during the back flush cycle. This avoids conversion of the copper oxide to metallic copper, or, in general, reduction of the oxidizing agent by hydrogen.

During the back flush cycle, the desorbed organic compounds from detention column 31 are directed through port 17 of vaporization chamber 12 into upstream chamber 14 where they are heated together with the organic carbon compounds vaporized or converted to carbon dioxide in boat 21 as described above, and, are carried into hydrogen reaction chamber 16 for conversion to methane in the presence of the contained nickel catalyst. Suitable temperatures for effective methane conversion range from 200° C. to 600° C. and preferably are on the order of 350° C. The methane gas is swept by carrier gas supplied from sources 18 and 35 through open valve $V_3$ and through water stripper 34 to the flame ionization detector in which the total methane content is recorded.

In a typical timing sequence, acidified sample is supplied to boat 21 at station 22 and moved to vaporization chamber 12. Gas is permitted to flow in the forward flush position of the valves for 1.5 minutes while the carbon dioxide portion of the sample vaporized. The valves are shifted to a reverse flush position and the boat is then moved into chamber 14. After 2 minutes of pyrolysis, the valves are turned to an off position and the boat is returned to station 22 where it is allowed to cool for about one minute prior to sample injection. It is apparent that the above system can perform a complete cycle in 5 minutes or less, depending upon the operating temperatures.

Typical flow rates for the above system are as follows: 60 ml./minute of $H_2$ from source 29, 15 ml./minute of helium from auxiliary source 18 and 60 ml./minute of helium from source 29.

In a system of the above type, it is apparent that inorganic carbon in the initial sample, primarily from sources such as carbonates and bicarbonates, has been removed prior to pyrolysis so that a direct reading of the organic carbon as indicated by the quantitation of methane in the flame ionization detector can be performed. The above system has been described in conjunction with a fluid sample system utilizing a single movable boat with multiple stations. In this system the injection port is not subject to the extremely high temperatures of pyrolysis which could fuse a portion of the sample to the sample inlet port which could cause contamination. A boat system is particularly advantageous when analyzing a sea water sample. If such a sample were directly injected into the quartz tube preferably used as the wall of the pyrolysis chamber, the salt (NaCl) reacts with the pyrolysis tube to form an unsuitable glass-like material unable to withstand high temperatures. In the boat system, the sample remains in the inert platinum boat and substantial quantities of salt do not contact the pyrolysis tube.

The above system produces an excellent linearity of response of at least one to 500 p.p.m. carbon with a reproducibility of ± p.p.m. carbon or ±2% of the value, whichever is higher.

It should be understood that the above reductive pyrolysis system could be employed without a boat fluid sampling by direct injection into a single chamber utilized for vaporization at a first temperature of, say, 80° C. during the forward flush cycle and at a second pyrolytic temperature during the back flush cycle. Such an overall system is generally described with respect to the oxidative pyrolysis system described hereinafter.

It should be further understood that the above system may be utilized for the separate measure of ammonia and low molecular weight amines on the one hand and organic nitrates and high molecular weight organic nitrogen compounds on the other hand. The same general system would be employed except that there would be neither an acidification step nor the use of oxidizing agent in chamber 12. Also, a different packing material may be used for the detention column, and a flame thermionic indicator means or a microcoulometric detector could be utilized as detector 36.

For reductive pyrolysis and analysis of organic nitrogen compounds, during volatilization in chamber 12 in the forward flush position, low boiling and low intermediate weight amines along with low boiling point organic nitrates such as methyl or ethyl nitrate are vaporized. The low molecular weight amines such as methyl and ethyl amine plus the ammonia vaporized are directed to detector 36, in this case suitably a microcoulometer such as sold by the Dohrmann Division of Envirotech Corporation under the designation MCTS–10. Other low boiling organic nitrogen compounds which are vaporized in vaporization chamber 12, such as methyl or ethyl nitrate, are retained upon the packing in detention column 31, suitably of the aforementioned type. Thereafter, in a back flush position the organic nitrogen compounds are desorbed from the column, converted to ammonia in the pyrolysis zone, and analyzed by detector 36. Fluid sample may be supplied either in a boat system, such as illustrated in FIG. 1, or a direct injection system as generally illustrated in FIG. 2 with respect to oxidative pyrolysis.

Referring to FIG. 2, another embodiment of an apparatus according to the present invention is illustrated in which the pyrolysis of sample containing organic carbon is of the oxidative type and in which carbon dioxide is produced in the pyrolysis zone and analyzed in a detector of, say, the infrared type. As the general system is essentially the same for pyrolysis of the oxidative or reductive type, like numbers will be used to denote like portions and only those which differ from the initial system will be described in detail.

A source of oxygen or oxygen-containing gas 38 is substituted for the hydrogen gas source in reductive pyrolysis. In the illustrated system, one chamber 39 is substituted for chambers 12, 14, and 16. Chamber 39 is provided with a furnace or other heating means indicated schematically by dotted lines at its periphery. The detector 40 is of a type suitable for analyzing oxidation products, in the organic analysis. For example, in the organic analysis system, an infrared detector may be used for measuring the carbon dioxide reaction product.

In operation of the above system for oxidative pyrolysis in the determination of organic carbon, a sample is supplied through a suitable inlet port, such as a syringe needle to sealed chamber 39. Acidification may take place immediately prior to or after sample injection. The fluid sample in chamber 39 may be heated to a suitable temperature to accelerate the vaporization of carbonic acid produced by acidification of the inorganic carbonate and bicarbonate salts. As discussed above, temperatures on the order of 80–130° are suitable for this purpose with the water being vaporized if temperatures over 100° C. are utilized at atmospheric pressure. During this vaporization stage, the valve assembly is set for the forward flush position indicated by the solid arrows in FIG. 2.

After vaporization, the valve settings are switched to the back flow position as indicated by the dotted arrows of FIG. 2, and the temperature of chamber 39 is raised to a level sufficient for oxidative pyrolysis of all organic carbon components of the sample to carbon dioxide. In this valve position, the organic carbon compounds sorbed on the detention column are swept by carrier gas from source 35 into chamber 39 where they are pyrolytically oxidized to carbon dioxide along with the remainder of the sample in the chamber. The carbon dioxide is then swept through the water stripping column 34 and past detector 40 for quantitative analysis.

A significant advantage of the detention column 31 in the above system is derived from the characteristic of the detector to be selectively highly responsive to an element in one form but not in another. For example, in a reductive pyrolytic system for the analysis of organic carbon, a flame ionization detector is highly responsive to the methyl ($-CH_3$) group and only faintly responsive to the carboxyl ($-COO-$) group. The detention column retains compounds having functional groups other than the methyl group and the retained compounds are converted to methane in the pyrolysis zone before passing to the detector. Thus, the detector signal can be calibrated in parts per million of carbon independent of the functional groups of the organic carbon compounds in the original sample.

It would be possible, although not very economical, to combine the oxidative and reductive pyrolytic systems for nitrogen determination. In that case, the ammonia and low molecular weight amines passing through the detention column in the forward flush position would be directed to a one suitable type of detector such as of the flame thermionic type. During the back flush cycle, the organic nitrogen compounds would be oxidized in chamber 39 and directed through a water stripping column 34 to another type of detector suitable for nitric oxide determination.

It should be understood that the oxidative pyrolytic system could utilize a boat 21 for sample loading, sample vaporization, and pyrolysis in separate compartments. In that case, the overall system would be similar to the one described with respect to the reductive pyrolysis system of FIG. 1 with the obvious difference that an oxygen-containing gas would be utilized in place of hydrogen. Although there is a distinct advantage in separating the pyrolytic chamber of the reductive pyrolysis system into a first zone which is hydrogen deficient and a second hydrogen-rich zone, there is no similar advantage in separating the oxidative pyrolysis chamber into two zones. Furthermore, it should be understood that the system can be employed with or without a catalyst.

For certain specialized sample systems, it may be desirable to use other means of injecting sample in accordance with the present invention. For example, it is contemplated to inject the sample into the system in accordance with the method and apparatus described in a co-pending U.S. application entitled "Solid Sampler, Apparatus and Method" bearing Ser. No. 800,946, filed Feb. 20, 1969, incorporated herein by reference.

It is apparent from the foregoing that a system has been provided for the direct determination of organic carbon and for the selective determination of certain nitrogen compounds. This has been accomplished by the utilization of a detention column packed with gas chromatograph-type packing to selectively separate volatile components according to their sorptive characteristics.

We claim:

1. In a method for analyzing a sample-containing fluid, the steps of
   (a) volatilizing a portion of the sample-containing fluid and leaving the remaining portion non-volatilized;
   (b) conveying said volatilized sample portion in a carrier stream through a packed detention column;
   (c) selectively sorbing a portion of said volatilized sample upon said detention column packing while venting the non-sorbed remainder of said volatilized sample in said carrier gas;
   (d) switching the flow of carrier gas through said detention column to desorb said sorbed sample and convey the same to a pyrolysis zone;
   (e) pyrolyzing said desorbed sample and the non-volatilized sample to form a gaseous pyrolysis product; and
   (f) conveying said pyrolysis product in a carrier gas to a zone for selectively and quantitatively detecting a portion of said product.

2. A method as in claim 1 in which the pyrolysis in step (e) is of the oxidative type wherein an oxygen-containing gas is supplied to said pyrolysis zone and the selectively indicated pyrolysis product is selected from the group consisting of carbon dioxide and nitric oxide.

3. A method as in claim 1 in which the fluid portion of the sample-containing fluid comprises water and the gaseous reaction product from step (e) is passed through a water stripping column to remove entrained water vapor prior to passage into said quantitative indication zone.

4. A method as in claim 1 in which hydrogen is supplied to the pyrolysis zone of step (e) and the selectively indicated pyrolysis product is selected from the group consisting of methane and ammonia.

5. A method as in claim 1 in which the pyrolysis zone of step (e) is separated into an upstream zone deficient in hydrogen and a downstream hydrogen reaction zone maintained under a hydrogen-rich atmosphere and the sample is volatilized in the upstream zone and a portion is converted into pyrolysis product in the downstream zone.

6. A method as in claim 1 in which the sample-containing fluid is supplied in a boat to the vaporization zone and said boat is moved into the pyrolysis zone during the pyrolysis reaction.

7. A method as in claim 6 in which said sample is volatilized and pyrolyzed in the same zone by elevating the temperature for pyrolysis.

8. In a method for analyzing a water-based sample containing organic carbon compounds and inorganic carbonate and bicarbonate salts, the steps of
   (a) acidifying the sample to a sufficient extent to convert the carbonate and bicarbonate salts to carbonic acid including carbon dioxide;
   (b) volatilizing in a first zone a portion of said sample including said carbon dioxide and volatile organic carbon compounds;
   (c) conveying said volatilized sample portion in a carrier stream from said first zone though a packed detention column;
   (d) selectively sorbing certain volatile organic carbon compounds upon said detention column packing while venting a stream containing said carbon dioxide;
   (e) switching the flow of carrier gas through said detention column to desorb said sorbed organic carbon compounds;
   (f) pyrolyzing said desorbed organic compounds from step (d) and the non-volatilized sample organic carbon to form a gaseous pyrolysis product; and
   (g) conveying said pyrolysis product in a carrier gas to a zone for selectively and quantitatively indicating a portion of said product.

9. A method as in claim 8 in which the pyrolysis in step (f) is of the oxidative type wherein oxygen is supplied to said pyrolysis zone and the selectively indicated pyrolysis product is carbon dioxide.

10. A method as in claim 8 in which the sample is heated in the first zone during step (a) to accelerate volatilization.

11. A method as in claim 8 in which the quantitative indication of step (g) is performed by a flame detection and the pyrolysis product stream from step (f) is passed through a water stripping column to remove entrained water vapor prior to indication.

12. A method as in claim 8 in which the quantitative indication of step (g) is performed in a flame detector selectively sensitive to methane.

13. An apparatus as in claim 12 in which a variable temperature heating means is associated with said detention column.

14. A method as in claim 8 in which the pyrolysis in step (f) is separated into an upstream zone deficient in hydrogen and a downstream hydrogen reaction zone maintained under a hydrogen-rich atmosphere, said upstream zone being maintained at a substantially higher temperature than said downstream zone and the sample is volatilized in the upstream zone and the selectively indicated pyrolysis product is methane.

15. A method as in claim 14 in which oxidizing agent is provided in the upstream zone which reacts to form carbon dioxide with desorbed organic carbon compounds and non-volatilized sample organic carbon including those characterized by the capacity of being reduced to elemental carbon at the temperature of the upstream zone, and said carbon dioxide is swept by the carrier gas into the hydrogen reaction zone in which it is converted into pyrolysis product comprising methane.

16. A method as in claim 15 in which the sample is supplied in a boat to the first zone for volatilization in step (a) and said boat is moved into the upstream pyrolysis zone during pyrolysis.

17. A method as in claim 16 in which said oxidizing agent is copper oxide supplied in said boat.

18. In an apparatus for the pyrolysis and analysis of a sample-containing fluid,
   (a) means forming at least one chamber for vaporization and pyrolysis;
   (b) means for heating said chamber means to predetermined temperatures ranging from sufficient for vaporization to at least sufficient for pyrolysis;
   (c) means for supplying a sample-containing fluid to said chamber means;
   (d) carrier gas supply means;
   (e) a detention column for containing packing capable of selectively sorbing a portion of a gas while permitting the remainder of the gas to pass therethrough and vent;
   (f) indicator means for selectively detecting gas of a predetermined character; and
   (g) valve means having a forward flush position serving, when selected, to direct carrier gas from said gas supply means from said chamber means through said detention column, and said valve means also having a back flush position serving, when selected, to direct carrier gas from said detention column through said chamber means into said gas indicator means;
   (h) whereby in the forward flush position at least a portion of said sample-containing fluid is vaporized in said chamber means and is conveyed in said carrier gas into said detention column so that gas of a predetermined type is selectively sorbed on said packing, and, in a back flush position, the selectively sorbed gas is desorbed from the packing and conveyed with the carrier gas into said chamber means maintained at pyrolysis temperature wherein it is reacted to form pyrolysis product which is directed to said indicator means.

19. Apparatus as in claim 18 in which said vaporization and pyrolysis chamber means comprises a single chamber.

20. Apparatus as in claim 18 for oxidative pyrolysis in which an oxygen-containing gas supply means is connected to said vaporization and pyrolysis chamber means.

21. An apparatus as in claim 18 together with a water stripping column communicating with said indicator means at one end and at the other end with the exit end of said detention column with said valve means in a forward flush position, and with the exit end of said vaporization and pyrolysis chamber means with said valve means in a back flush position.

22. An apparatus as in claim 21 in which said detention column has an elongated essentially uncoiled configuration and said heating means is a resistance type electrical heating coil.

23. An apparatus in claim 18 in which said vaporization and pyrolysis chamber means comprises a vaporization chamber and a separate pyrolysis chamber means.

24. An apparatus as in claim 23 for reductive pyrolysis and together with hydrogen gas supply means connected to said pyrolysis chamber means.

25. An apparatus as in claim 23 together with a feed-through passage extending from said vaporization chamber into said pyrolysis chamber means and a boat carried by said passage and having a cavity adapted for receiving the sample-containing fluid and means for moving the boat between said vaporization chamber and said pyrolysis chamber means.

26. An apparatus as in claim 25 in which said pyrolysis chamber means includes an upstream heating chamber connected to said vaporization chamber and a communicating hydrogen reaction chamber and wherein said feed-through passage for said boat extends into said heating chamber but not into said hydrogen reaction chamber.

27. An apparatus as in claim 25 together with a sample loading station communicating with the vaporization chamber end of said feed-through passage and means for moving said boat from said sample loading station to said vaporization chamber.

28. An apparatus as in claim 27 in which the pyrolysis chamber means includes a heating chamber connected to said vaporization chamber, and a communicating hydrogen reaction chamber together with a duct from said hydrogen gas supply means directly into said hydrogen reaction chamber, the communication between said hydrogen reaction and heating chambers being such as to prevent substantial flow of gas from the former to the latter with said valve means in a forward flush position.

References Cited

UNITED STATES PATENTS 3,425,807  2/1969  Levy ............ 23—253 PC

OTHER REFERENCES

Research and Development, May 1963, pp. 20, 21 relied on.

MORRIS O. WOLK, Primary Examiner

R. M. REESE, Assistant Examiner

U.S. Cl. X.R.

23—253 PC; 73—23.1